United States Patent [19]

Kollodge

[11] Patent Number: 5,056,914
[45] Date of Patent: Oct. 15, 1991

[54] CHARGE INTEGRATION RANGE DETECTOR

[75] Inventor: Jerome C. Kollodge, Boulder, Colo.
[73] Assignee: Ball Corporation, Muncie, Ind.
[21] Appl. No.: 551,887
[22] Filed: Jul. 12, 1990
[51] Int. Cl.⁵ .................. G01C 3/08; G01B 11/24
[52] U.S. Cl. ................................ 356/5; 354/403; 356/376; 358/107
[58] Field of Search .............. 358/107; 356/5, 376; 354/403

[56] References Cited

U.S. PATENT DOCUMENTS

| | | | |
|---|---|---|---|
| 4,277,167 | 7/1981 | Eppel | 356/5 |
| 4,380,391 | 4/1983 | Buser et al. | 356/5 |
| 4,522,492 | 6/1985 | Masunaga | 356/1 |
| 4,594,000 | 6/1986 | Falk et al. | 356/5 |
| 4,606,630 | 8/1986 | Haruki et al. | 356/1 |
| 4,611,912 | 9/1986 | Falk et al. | 356/5 |
| 4,627,722 | 12/1986 | Falk et al. | 356/4.5 |
| 4,707,698 | 11/1987 | Constant | 356/28.5 |
| 4,708,473 | 11/1987 | Metzdorff | 356/5 |
| 4,746,790 | 5/1988 | Sorimachi | 250/201 |
| 4,774,403 | 9/1988 | Arts | 250/205 |
| 4,794,262 | 12/1988 | Sato et al. | 250/560 |
| 4,830,485 | 5/1989 | Penney et al. | 356/1 |

Primary Examiner—Stephen C. Buczinski
Attorney, Agent, or Firm—Sheridan, Ross & McIntosh

[57] ABSTRACT

A system and a method for obtaining object data with a direct detection technique which employs radiation are disclosed. A set of radiation pulses are transmitted to an object area. A mechanical scan of the object area for returning pulses reflected off an object can be carried out for each pulse, so that each pulse is reflected onto a particular position of a light-sensitive array dependent upon the object distance and/or other data pertaining to the object. Alternatively, the scanning relative to each returning reflected pulse can be conducted by electrically scanning a radiation-sensitive array which comprises a CCD array having pixels. The scanning takes place relative to each pulse so that each returning reflected pulse strikes one or more pixels on the array so that the resulting signal reside at a position depending upon certain object data. The relationship between the generation of the pulses and the scanning can be changed as desired in order to seek objects at different ranges from the system or to improve accuracy of the object data.

49 Claims, 5 Drawing Sheets

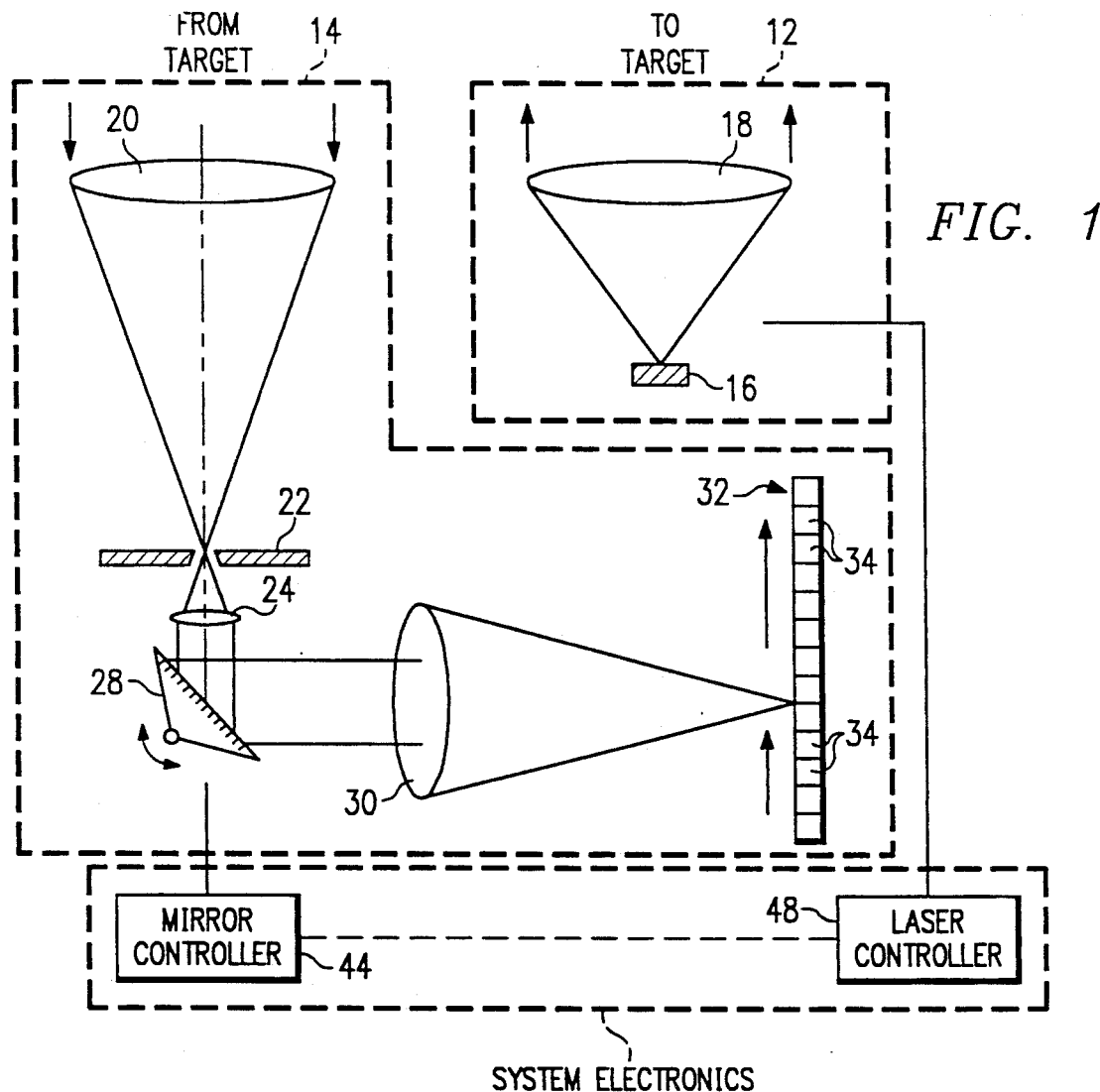
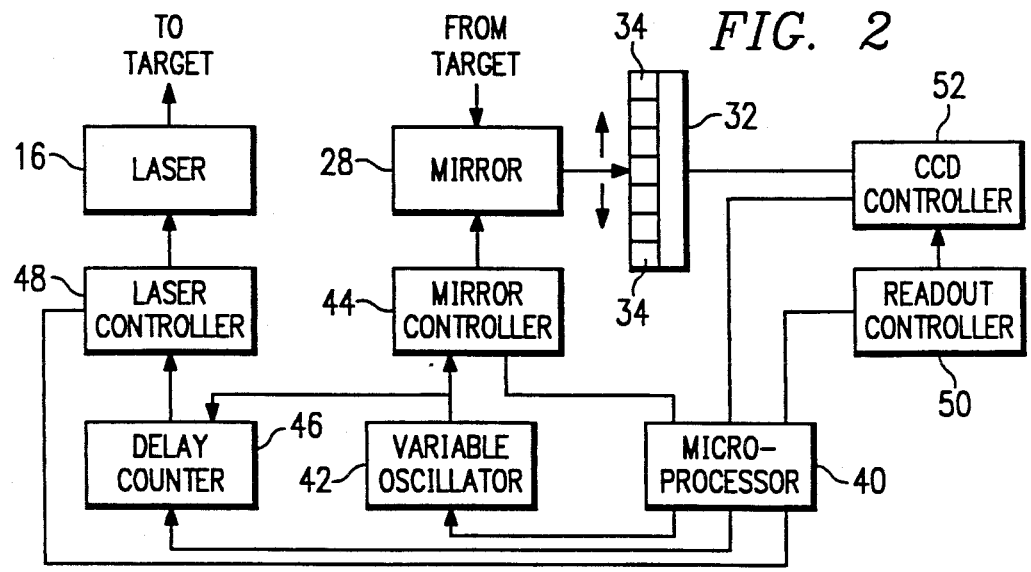

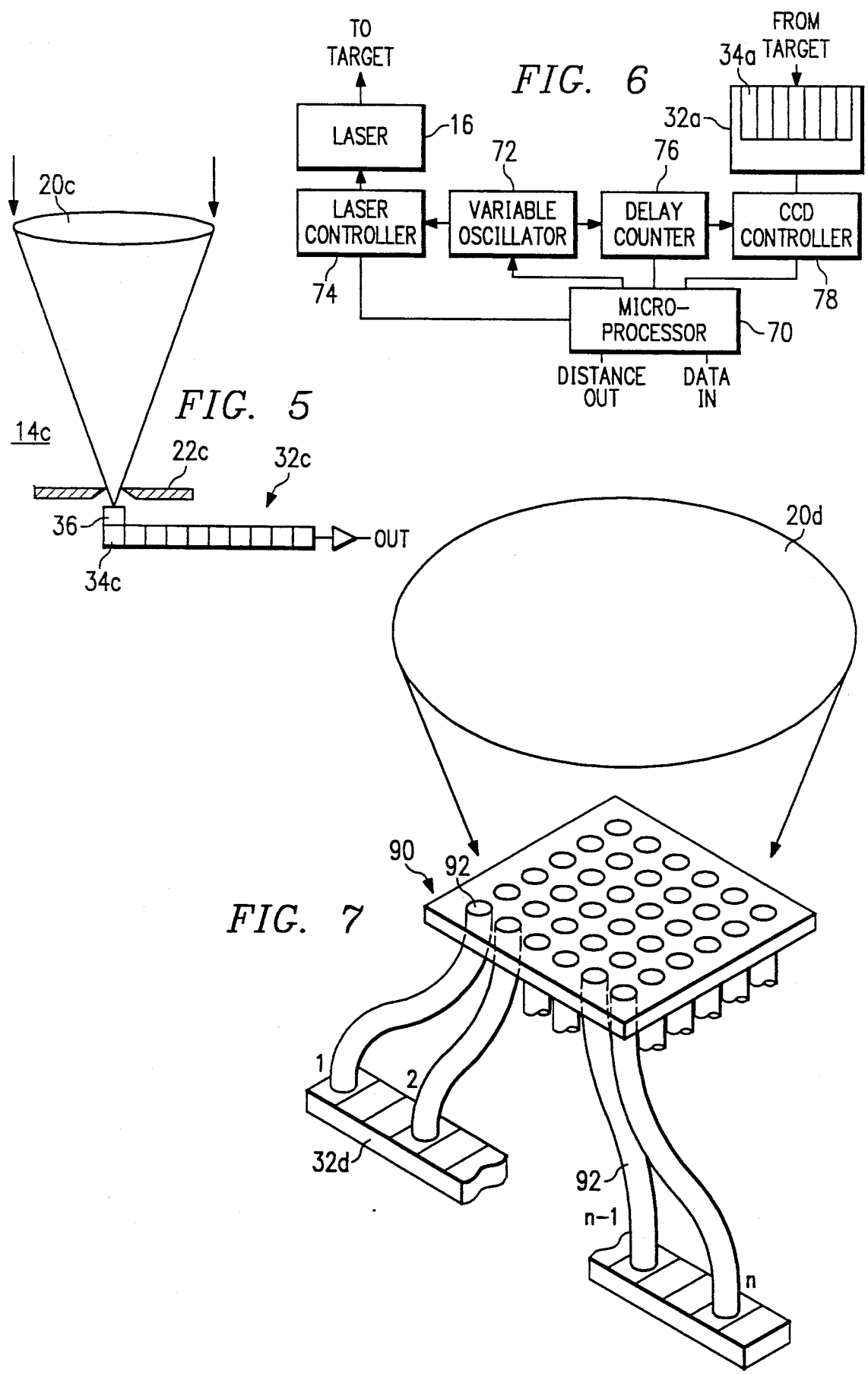

CHARGE INTEGRATION RANGE DETECTOR

BACKGROUND OF THE INVENTION

1. Field of the Invention

The present invention relates to the use of radiation to measure the distance and velocity of an object of interest. More particularly, the present invention relates to a charge integration ranger which utilizes radiation pulses, knowledge of the velocity of light and a charge transfer device detector to measure the distance and velocity of an object and provide three-dimensional imaging.

2. Description of the Related Art

Telemetry systems which determine object distance using optical radiation are known. Such systems send radiation towards a distant object and measure distance based on the reflected radiation that returns to the system. Distance is determined based on one of several types of calculations, including triangulation, frequency changes in the returned radiation, and the time the optical radiation takes to reach the object and return to the system.

One technique for measuring distance and velocity that has received widespread attention in recent years is heterodyne or coherent detection. In heterodyne detection systems, the frequency of an emitted optical radiation signal is modulated so that optical heterodyne detection can be employed By its very nature, optical heterodyne detection implies that some sort of interferometer is employed in the receiver for aiding in phase comparison The main advantages of heterodyne detection include narrowband signals, a high signal-to-noise ratio (SNR), shot-noise-limited performance and the ability to measure Doppler frequency shift in order to determine radial velocity Additionally, optical heterodyne detection requires a relatively low energy optical radiation source, permits detection at the quantum noise limit, and is theoretically more sensitive than known direct detection techniques.

In practice, heterodyne detection poses a number of difficulties that may, even under mildly adverse conditions, severely affect performance For example, large object velocities require high detector bandwidths. High bandwidth detectors normally have a higher noise equivalent power and other undesirable characteristics. Additionally, without some prior knowledge of the signal location, narrow bandwidth signals at high frequencies require long search times or a large number of tuned filters Further, interferometers are extremely sensitive devices which require precise phase front control. Any sort of unwanted phase perturbation, whether produced by or in the interferometer or by the laser source feeding the interferometer, will degrade the signal and can be considered noise. Many other sources of noise also exist While some of the noises, such as detector, background, electronic and local oscillator shot noises, can be effectively overcome by using a large local oscillator, a number of other noise sources persist. These sources include modulation instability and distortion, optical misalignment and imperfections, vibrations, atmospheric turbulence, object vibration and rotation, and reflection modulation.

So while heterodyne detection theoretically offers a great number of advantages, it is not presently practical for many applications. Extensive engineering is required to minimize the noise sources, and these required noise reduction techniques are complex, difficult to implement and expensive. Further, such techniques may require continuous monitoring, which further reduces the applicability of heterodyne detection.

So-called "direct" detection is widely used in range finding systems. Simple implementations of direct detection systems employ an array of light-sensitive diodes which has a known mathematical relationship with a radiation source so that the distance of an object can be determined by trigonometric methods, such as triangulation. Quite commonly, these systems are used in cameras for determining the range of an object to be photographed for focusing an automatic lens. However, such systems have limited applications because of limited range capability and relatively poor range resolution.

For example, U.S. Pat. No. 4,522,492 to Masunaga discloses a distance measuring device which includes an infrared emitting portion having an infrared emitting diode and a projection lens, and an infrared receiving portion which includes a receiving lens and a line sensor comprising light-sensitive elements. Since this system measures distance by triangulation, the object to be measured must be positioned along the optical axis of the infrared emitting portion. Additionally, a line from the emitting lens to the receiving lens is perpendicular to the optical axis, and the two lenses must be a known distance apart. Distance to the object is calculated based upon which light-sensitive element in the line sensor receives the infrared light reflected from the object, as the two non-right angles in a right triangle created with the object can be determined, since the distance between the light-sensitive element and the optical axis is known. However, applications of such a system are limited to situations where the exact direction of an object to be ranged is known, since the object must be aligned along the optical axis of the infrared emitting portion. Further, only distance can be measured.

A second direct detection system is disclosed in U.S. Pat. No. 4,746,790 to Sorimachi. In the Sorimachi system, a pair of light receiving portions are utilized each comprising a lens and an array of light-sensitive elements The arrays can be comprised of charge-coupled device (CCD) arrays. The object to be ranged is aligned along the optical axis of a first portion, and the lens of the second portion, the CCD array, or both are moved until light reflected from the object is received by a predetermined element of the CCD array of the second portion The distance between the lenses is known, and any movement of the lens and/or the array is measured so that the distance of the object can be determined by triangulation. This system has the same limitations as the Masunaga system.

Other direct detection systems measure the phase shift of the return from an amplitude modulated source (tone ranging) or the round trip time of a very narrow pulse. However, all of the known direct detection systems suffer from a number of drawbacks. For example, known direct detection systems suffer from relatively low SNR because of the high electronics noise associated with processing the signal. Accordingly, sensitivity of direct detection systems has been relatively poor. Further, large electrical bandwidths are required for the known pulse direct detection systems. Pulse integration could reduce the system bandwidth, but pulse integration results in the integration of both signal and noise, resulting in a less than optimum SNR or sensitivity. Low-sensitivity translates into a need for relatively high optical powers. High optical powers pose an eye safety problem, and such systems require a high energy radiation source. Among other problems, higher power generation requirements tend to reduce portability. All of these factors reduce the number of possible applications of direct detection systems.

A great deal of research has been performed in the field of heterodyne detection because of the deficiencies in the existing direct detection techniques. However, these efforts have yet to produce a heterodyne system capable of widespread application. Accordingly, a need exists for a range detection system which has the low-noise characteristics, simplicity and reliability of direct detection systems and the high sensitivity, high SNR and narrow bandwidths theoretically available in heterodyne detection systems.

SUMMARY OF THE INVENTION

Accordingly, an object of the present invention is to provide a direct detection system which provides the performance advantages of a heterodyne range detection system but is more reliable, less complex and less expensive to manufacture than a heterodyne detection systems.

A further object of the present invention is to provide a direct detection system which requires a relatively low optical power.

Another object of the present invention is to provide a ranging system having an extremely fast update time.

Yet another object of the present invention is to provide a direct detection system which is not limited to detecting the distance of an object on its optical axis.

Still another object of the present invention is to provide a direct detection system which is capable of three-dimensional imaging.

A still further object of the present invention is to provide an optical ranging system capable of using any of a variety of lasers, including semiconductor, solid state and gas lasers at differing wavelengths and power levels.

One still further object of the present invention is to provide an optical detection system which will not damage the vision of its users.

An additional object of the present invention is to provide an optical ranging system of reduced complexity which can perform both ranging and velocity detection.

To achieve the foregoing objects, and in accordance with the purpose of the invention, as embodied and broadly described herein, a ranging system according to the present invention comprises: a transmitter for transmitting a series of at least one radiation pulse to an object area based on a command signal; a receiver for receiving returning radiation reflected off an object in the object area and selectively redirecting the returning radiation from each pulse dependent upon the command signal and object characteristics; and at least two radiation detectors arranged to receive the redirected returning radiation from the receiver, each of the radiation detectors being representative of different object data. Object data is determined based on which of the radiation detectors receives the redirected returning radiation.

Preferably, the radiation pulses are laser pulses and the transmitter includes a laser and a laser controller for transmitting laser pulses based upon the command signal. The receiver may include a scanning mirror and a scanning mirror controller for causing the mirror to scan relative to each laser pulse based upon the command signal so that the returning radiation from each pulse is redirected to strike one of the radiation detectors dependent upon the distance of the object. Preferably, the radiation detectors comprise pixels in a one-dimensional CCD array, and the object characteristics include a distance range defined by a minimum and a maximum distance in which an object is to be sought, the distance range being scanned by delaying the start of the scanning of the mirror and controlling the speed of the scanning of the mirror relative to each pulse based upon the speed of light and the time necessary for a pulse to reach and return from the minimum distance and the maximum distance in the distance range. When the radiation detectors comprise pixels, returning radiation from each pulse is stored as a charge in one or more of the pixels, and after integration of the series of pixels the charges are read out of the CCD array.

The present invention also discloses a method for obtaining object data. The method provides the steps of transmitting a radiation pulse to an object area; scanning relative to the radiation pulse returning radiation received from the object area across a radiation-sensitive array so that returning radiation from the radiation pulse reflected from an object in the object area strikes a position on the radiation sensitive array dependent upon distance to the object and determining the distance to the object based on the position on the radiation-sensitive array which received the reflected radiation. The scanning can be delayed relative to the transmission of the radiation pulse so that a desired distance range only is scanned for an object.

A system for determining characteristics of an object is also disclosed, the system comprising a generator and transmitter for generating and transmitting a series of pulses toward an object area dependent upon a control signal, a focusing system for focusing the returning radiation from the radiation pulses, and a receiver for receiving and storing the returning radiation from the object area, the receiver being positioned proximate to a focal point of the focusing system. During an anticipated return time period for each pulse, the receiver is continuously scanned based on the control signal so that the returning radiation is accumulated at locations within the receiver based on distance to the object. The receiver can comprise a one-dimensional CCD array having a predetermined number of pixels, with the focusing system focusing returning radiation onto one of the pixels. The CCD array shifts charges from pixel to pixel during the anticipated radiation return time period. Each pixel is representative of a distance to the object, but distance to an object can be determined to sub-pixel resolution by determining the multiple-pulse centroid on the CCD array.

The present invention also discloses a three-dimensional imaging system comprising a transmitter for transmitting a radiation pulse to an object in an object area; a receiver including a focusing system for focusing the returning radiation and a plurality of optical fibers having a first end arranged in a common focal plane of the focusing system for receiving returning radiation relative to respective points in the object area; and a CCD array having a set of pixels dedicated for each optical fiber, each set being located proximate to a second end of one of the optical fibers for receiving and storing as a charge radiation received at the first end of each optical fiber. By scanning the CCD array during the anticipated return time of radiation from the pulse, distance to the object in the object area relative to each point can be determined and the shape of the surface of the object can be interpolated.

Other objects and advantages of the present invention will be set forth in part in the description and drawings which follow, and, in part, will be obvious from the description. The present invention will now be described with reference to the following drawings, in which like reference numbers denote like elements throughout.

BRIEF DESCRIPTION OF THE DRAWINGS

FIG. 1 is a schematic diagram of the optical components of a mechanical scanner according the present invention;

FIG. 2 is a block diagram of system electronics for controlling the mechanical scanner of FIG. 1;

FIG. 5 illustrates the receiving portion of the optics for an electronic scanner utilizing a detector of different wavelength sensitivity with a Si CCD;

FIG. 6 is a block diagram of the system electronics for an electronic scanner according to the present invention;

FIG. 7 illustrates the receiving portion of a three-dimensional imager according to the present invention.

DESCRIPTION OF THE PREFERRED EMBODIMENTS

Figure 3A:
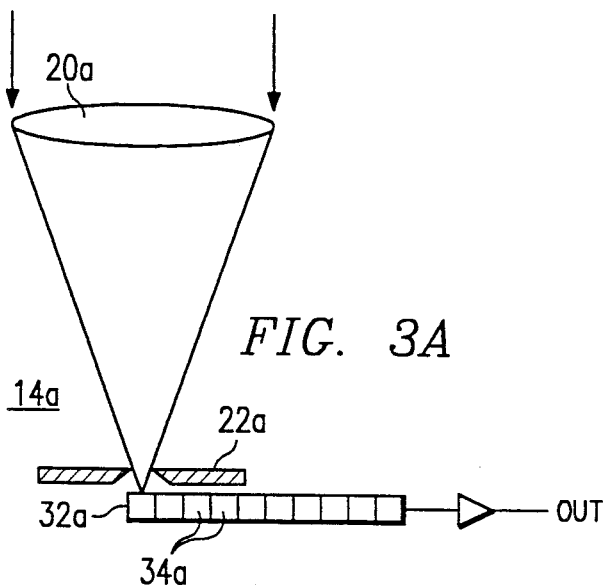
FIG. 3A is a schematic diagram illustrating the receiving portion of the optics for an electronic scanner utilizing a linear CCD according to the present invention.

Reference will now be made in detail to the present preferred embodiments of the invention, examples of which are illustrated in the accompanied drawings.

The charge integration range detector of the present invention is a direct detection device which has overcome the low sensitivity and poor noise characteristic problems of the prior art direct detection devices. This is accomplished by using the natural charge integration characteristics of charge transfer device (CTD) detectors such as charge coupled devices (CCD). The charge integration range detector of the present invention operates by mapping time of flight data of radiation pulses into position(s) along a linear array of radiation-sensitive regions, such as the pixels of a CCD. The mapped radiation pulses are generated by a radiation source, such as a laser, and are reflected off an object to be ranged. A synchronization signal is used to initiate both generation of the radiation pulses and either a mechanical or an electronic scan of the radiation-sensitive array. The mechanical scan is performed using a mechanical scanning mirror which sweeps received radiation across the array. The sweep is conducted relative to the generation of each pulse based on a simple speed of light/distance calculation so that radiation from a returning pulse will strike a position on the array dependent on the distance of an object reflecting the pulse. Similarly, the electronic scan is performed by electrically scanning the radiation-sensitive array relative to each pulse so that the returning pulse will reside at a position on the array dependent on the distance of an object reflecting the pulse. If the object is relatively slow moving or stationary and/or the distance range associated with each element large enough, radiation from each reflected pulse in a set of pulses will strike the same element of the array and be accumulated or integrated therein. After a sufficient number of return pulses have been integrated in the array to yield an acceptable SNR, each element in the array is read out.

The distance to the object is directly related to the element having the largest accumulated signal charge. When the array is one-dimensional or linear, each element corresponds to a particular range of distance which is dependent on the scan rate, the range represented being incremental with each element from one end of the array to the other.

For detecting the distance to objects within a particular range of distances, such as 10 to 20 kilometers from the system, the synchronization signal can be appropriately gated. This gating delays the scanning of the mirror or the electronic scanning of the array to permit the pulses to travel the 10 kilometers to and back from the near edge of the object range before scanning begins. The scanning delay and speed are such that the first element in the array would receive pulses reflected from objects approximately 10 kilometers away, while the last element would receive pulses reflected from objects approximately 20 kilometers away.

For all prior direct detection ranger concepts, a major noise component is the integrated readout noise. However, for the approach described here, readout noise occurs only once per range measurement. Thus, the readout noise is kept to an absolute minimum by reading-out the CCD array after signal integration, that is, after an entire set of pulses have been received and summed within the elements of the array. Additionally, since the object region is continuously scanned, each element spends only a fraction of the signal integration time staring at the background. In this way, an automatic range gate is formed to significantly reduce background noise.

With the above-mentioned concepts and advantages in mind, several embodiments for the present invention have been developed, examples of which are discussed below.

Mechanical Scanning System

A mechanical scanning charge integration range detector 10 is illustrated in FIG. 1. The detector 10 illustrated in FIG. 1 is a bi-static system, in that the configuration includes a separate transmitter 12 and a separate radiation receiver 14. The transmitter 12 comprises a pulsed laser source 16. The laser source 16 is located in the focal plane of a transmitter lens 18. The transmitted pulses and receiver 14 are aimed at the object area by the user.

The laser pulses reflect off an object, and some portion thereof return to the radiation receiver 14. The radiation receiver 14 includes a primary receiving lens 20. A small slit 22 is positioned at the focal plane of the primary receiving lens 20 to reject background from outside the illuminated object area. A collimating lens 24 is positioned on the optical axis of the primary receiving lens 20 on the system side of the slit 22 to collimate the returning pulses. The collimated pulses then pass through an interference filter (not shown) to further reject background radiation and are reflected by a scanning mirror 28 to a focusing lens 30. Depending on the distance range in which objects are being sought, the scanning mirror 28 is controlled to scan the object area once for each pulse emitted from the laser source 16 based upon a common synchronization signal. The scanning mirror 28 reflects the return pulses from the object onto a certain point or region of a linear array 32 dependent upon the distance of the object. The linear array 32 is comprised of individual light-sensitive elements 34. More particularly, the scanning mirror 28 is controlled based on the speed of light to reflect each returning pulse so that the return pulse from the object falls on one or more element 34 of the array 32 dependent upon the distance of the object. Each returning pulse is stored by the element(s) 34 on which it falls.

The relationship between the returning pulses and each element 34 of the array 32 can be fixed or changeable by an operator through an appropriately programmed computer, depending on the application. The relationship between each pulse and each element 34 in the array 32 is mathematical, dependent on the speed of light. By making each pulse width sufficiently short, by setting the time between each pulse in a set of pulses to be minimal and by scanning at the appropriate speed, each returning pulse will fall on the same element 34 unless the velocity of the object is tremendous and/or the range represented by each element 34 is extremely small, since a great number of pulses can be transmitted and returned in a small fraction of a second in most applications.

As discussed above, by appropriately delaying the synchronization signal, a given range interval any desired distance away from the system, such as 10 to 20 kilometers, can be scanned for objects. This gating greatly increases the flexibility of the present invention as is discussed in detail below.

Since it takes different quantities of time for a pulse to return from different distances, the same system can be controlled to iteratively determine distance of an object with ever increasing accuracy over several sets of emitted pulses. Depending on the sophistication of the computer programming and/or the needs of a given application, adjustments can be input by an operator or made automatically by the computer in a fraction of a second. In this way, the system can be made first to scan a large distance for an object and make a rather general assessment as to the object distance, and then change the synchronization of each pulse and scan and the distance represented by each element to determine the distance more precisely. For example, the array 32 can comprise as few as two elements 34. At first, the pulses and scanning of the return pulses are synchronized to determine if the object is within 0 to 10 kilometers or 10 to 20 kilometers. Then, if the object is determined to be within 10 to 20 kilometers, the pulses and the scanning are resynchronized to determine if the object is within 10 to 15 kilometers or 15 to 20 kilometers. Resynchronization of the pulses and scanning is continued until a desired accuracy for distance is achieved. Since the pulses travel at the speed of light and an entire set of pulses can be emitted and received in a small fraction of a second, a computer-controlled rangefinder using sub-pixel interpolation can determine the distance to an object within a few centimeters.

After a sufficiently large number of pulses have been generated by the laser 16 and integrated in the array 32, the stored information in the radiation-sensitive array 32 is read out. By reading out the radiation-sensitive array once, using a narrow bandwidth, for a set of pulses, readout noise is kept to a minimum and the SNR is high. As discussed above, distance is directly related to the element 34 of the radiation-sensitive array 32 having the largest signal count, i.e., the element in the CTD which has stored the most photo electrons. By relating the element having the largest signal count to the distance which corresponds to the element, the coarse distance to the object can be determined. Signal stored on the adjacent pixels is then used to interpolate the sub-pixel position of the pulse to approximately 0.01 pixel. Further, the distance of multiple objects can be determined with a single set of pulses, as the reflected pulses from different objects will strike different elements 34 if the distances are different. Thus, a range profile can be formed for applications such as measuring particulates, etc. in the atmosphere.

The laser pulses by the output laser source 16 should preferably have a frequency that matches the characteristic spectral window of a radiation-sensitive array 32 so that the radiation-sensitive array 32 being utilized will be able to store photo-electrons produced by the laser source 16. In the preferred embodiment, the laser source 16 comprises a GaAs diode laser and the radiation-sensitive array 32 comprises an Si CCD device. The wavelength produced by the GaAs diode laser has a wavelength which substantially falls under the CCD response curve. Although the laser described for the preferred embodiment is a semiconductor laser, it should be realized that any solid-state or gas laser whose wavelength output falls under the Si CCD response curve can be used. For example, Nd:YAG and ruby lasers can be used in place of a GaAs diode laser. Preferably, the GaAs diode laser is pulsed so that its pulse width is equivalent to the scan time for one pixel with a pulse repetition frequency (PRF) equivalent to the entire CCD array scan time. Preferably, the detector 32 comprises 1×n element linear CCD, where n is selected to optimize performance for the specific application and is typically less than 1000. The number of pulses required to take a reading (i.e., the update period) depends on the distance to the object and desired SNR, and may vary from one to several thousand. That is, for a predetermined SNR, the greater the distance to the object the lesser the accumulated return radiation per pulse, and therefore, the greater the number of pulses necessary in an update period to achieve the desired SNR. Each update period may vary from less than a milli-second to several seconds.

This is not to say that the present invention is limited to Si-type array devices and lasers that have output wavelengths within the Si response curve. InSb, lead-salt, GaAs, HgCdTe and other like array devices can be substituted for the Si-type array device. Since each such device has its own characteristic spectral window, an appropriate radiation source having the appropriate wavelength must be used in combination therewith. Of these array devices, the HgCdTe array device may be the most significant because of its sensitivity at 10.6 microns and the resulting potential to penetrate haze and smoke. An embodiment of the present invention that has such capabilities will be discussed below with respect to electronic scanning after the following description of the system electronics for the mechanical scanning embodiment. The scanning mirror 28 and the pulse for the laser diode 16 are driven based on a common synchronization pulse derived from the system electronics. The system electronics are illustrated in FIG. 2. The system electronics are controlled by a microprocessor 40. The microprocessor 40 controls a variable oscillator 42 depending on the desired pulse length. The variable oscillator 42 feeds both a mirror control 44 and a laser delay counter 46. Based on signals from the variable oscillator 42 and the microprocessor 40, the mirror control 44 drives the mirror 28 via a motor (not shown). As discussed above, the mirror 28 is controlled to scan so that a reflected pulse from the laser 16 strikes an element of the radiation-sensitive array 32 dependent upon the range of the reflecting object. In this regard, if the distance range to be scanned is not contiguous to the system, i.e., 10 to 20 kilometers, the microprocessor 40 communicates an appropriate delay to the laser delay counter 46. In this way, each laser pulse will be offset from the mirror scan by a required amount so as to effectuate a scan of the desired range from the system. A laser controller 48 controls a laser driver (not shown), for driving the laser diode 16 in the desired pulsed manner. The laser controller 48 receives an enable input from a readout controller 50 so that a new set of pulses is not generated from the laser diode 16 until data from the previous set of pulses is readout from the radiation-sensitive array 32. While basic pulse generation information is received from the variable oscillator 42, the laser controller 48 is connected to the microprocessor 40 for changing various parameters, including the number of pulses to be included in a pulse set, and for sending data to the microprocessor 40, such as when the set of pulses has been completed so that the radiation-sensitive array 32 can be readout.

The readout controller 50 controls a CCD controller 52, which actually reads the data out of the radiation-sensitive array 32. A predetermined time after the microprocessor 40 has initiated sending a set of pulses from the laser diode 16, the microprocessor 40 sends an enable signal to the readout controller 50 indicating that it is time for the CCD controller to readout the radiation-sensitive array 32. Generation of the enable signal is based on a signal from the laser controller 48 or an internal clock. Alternatively, the readout controller 50 can be connected directly to the laser controller 48 for receiving a signal indicative of the beginning or the end of a set of pulses. Such a readout controller 50 would have an internal counter for counting an appropriate delay before sending a signal to the CCD controller 52 to readout the radiation-sensitive array 32. In either case, after the CCD controller 52 reads out the radiation-sensitive array 32, data read out from each pixel 34 of the radiation-sensitive array 32 is forwarded to the microprocessor 40, which determines the distance of any object(s) detected by the system based upon the stored charge from each pixel.

As discussed, based on the time delay between the mechanical scanning of the mirror 28 and each pulse generated by the laser diode 16, each pixel 34 in the radiation-sensitive array 32 corresponds to a certain distance or distance range from the system. Also as discussed above, by changing the relationship between the pulses and the scanning, each pixel can then represent a different distance or distance range. This permits a very accurate measurement of a distance to a previously unknown object at nearly any range from the system to be determined in minimum time by using a variety of synchronizations between the mirror and the laser pulses.

As will be appreciated by those skilled in the art, the range of a known object can be updated in a fraction of a second with a new set of pulses, and update data can be used to calculate velocity. Further, using known algorithms, range can be determined to the sub-pixel level based on the data readout from the radiation-sensitive array 32. The system can be designed or programmed so that multiple return pulses from a single object fall on more than one pixel. This permits the use of the known algorithms to determine the multiple pulse centroid and thus provide intra-pixel resolution. The algorithms can accurately determine range to within 1/100th of a pixel, resulting in excellent range resolution.

The mechanical scanning system of the present invention has been described relative to a bi-static system in which separate transmission and receiving units are utilized. However, as will be further appreciated by those skilled in the art, such a system can be realized using a single optical system which employs a beam splitter.

Electronic Scanning System

Figure 4A:
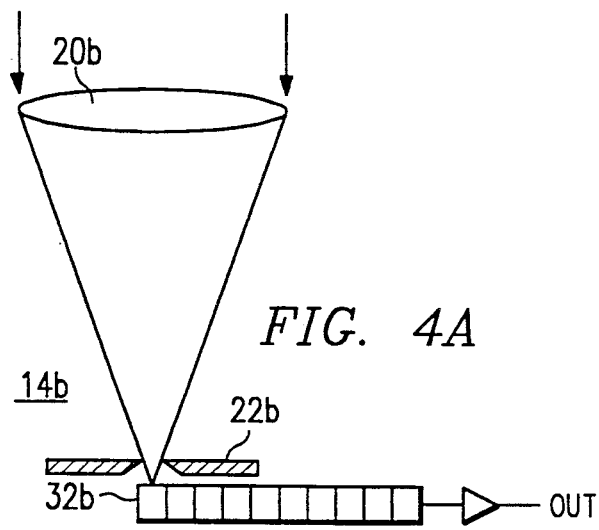
FIG. 4A is a schematic diagram illustrating the receiving portion of the optics for an electronic scanner utilizing a linear CCD with storage and optional output CCD registers.

A second embodiment of the present invention operates in accordance with the same principals as the first embodiment, except that rather than using relay optics and a moveable mirror to optically scan a radiation-sensitive array, the mirror and relay optics are eliminated and the radiation-sensitive array is electronically scanned in synchronization with each laser pulse. A first possible aspect of this embodiment is for range-only measurements to a single point. Three different implementations of this aspect of the present invention are illustrated in FIGS. 3A, 4A and 5, respectively. In the electronic scanning embodiment, the transmitting portion of the system is the same as illustrated in FIG. 1 for mechanical scanning, but the receiver portion is different from the receiver 14 of FIG. 1. In receivers 14a–14c of FIGS. 3A, 4A and 5, respectively, reflected radiation is focused by a lens 20a–20c, passes through a small slit 22a–22c to reject background, and impinges directly onto one (or more) of CCD pixels 34a–34c of CCD arrays 32a–32c.

The first implementation shown in FIG. 3A uses a simple linear CCD array 32a having n pixels 34a. The receiving lens 20a is focused on the right-most pixel 34a of the left half of the array 32a, designated pixel "n/2" in FIG. 3B. An appropriate time after the laser source is pulsed, a CCD scan begins towards the right until half of the pixels 34a are scanned. That is, the signal charge stored in each pixel 34a is repeatedly shifted one pixel to the right until half of the pixels 34a have been scanned and the charge originally in the pixel 34a designated "1" is in the pixel 34a designated "n/2−1", together with any additional charge received when the charge originally in location "1" was in the focal pixel 34a designated "n/2". Thus, if an object exists in the distance range, the pulse will have returned during the CCD scan and the resulting charge from the pulse will reside on one of the pixel(s) in the right half of the CCD array 32a.

Figure 3B:
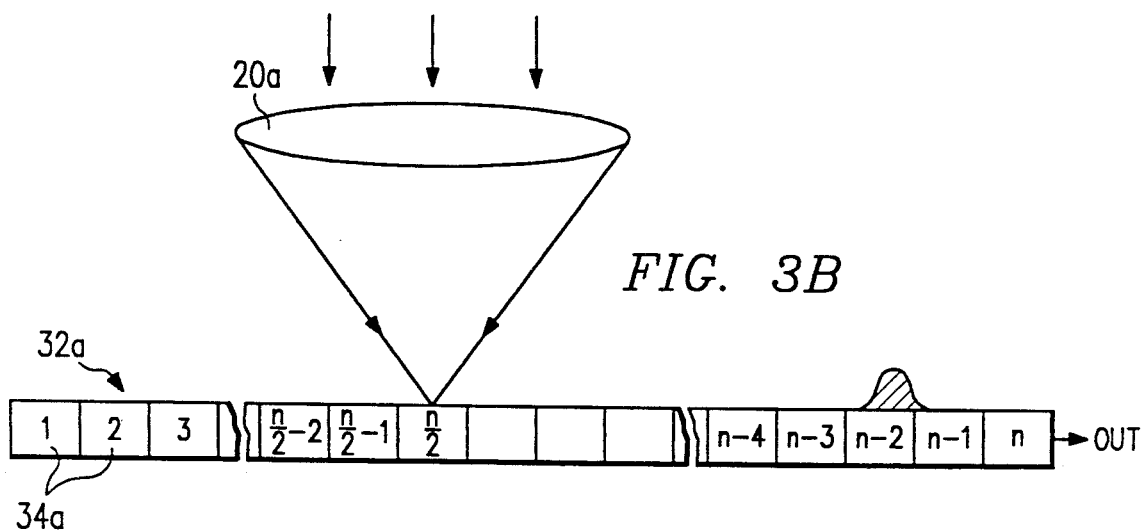
FIGS. 3B-3C illustrate the receiving, shifting, storing and reading out of reflected light pulses by the linear CCD electronic scanner of FIG. 3A.

Illustrated in FIG. 3B is the situation where the returning pulse struck the array 32a (and more particularly, the pixel 34a designated "n/2") after approximately two shifts to the right had occurred during a CCD scan. Upon completion of the electronic scan of the left-half of the array 32a, that is, after the charge originally stored in the pixel 34a designated "1" has been shifted past the pixel 34a designated "n/2" (at a time which should correspond to the end of the window for the anticipated return of the pulse), the charge from the received pulse mostly resides in the pixel designated "n−2". Since the scanning is continuous and the pulse width will generally be equal to the scan time for a single pixel, received pulses will commonly fall on two consecutive areas as they pass the focal pixel 34a. In FIG. 3B, a portion of the pulse was received just prior to the shifting of the charge that now resides in the pixel 34a designated "n−2" from pixel location "n/2−1" to pixel location "n/2". Thus, it follows that this portion of the charge from the pulse now resides in pixel location "n−1".

Figure 3C:
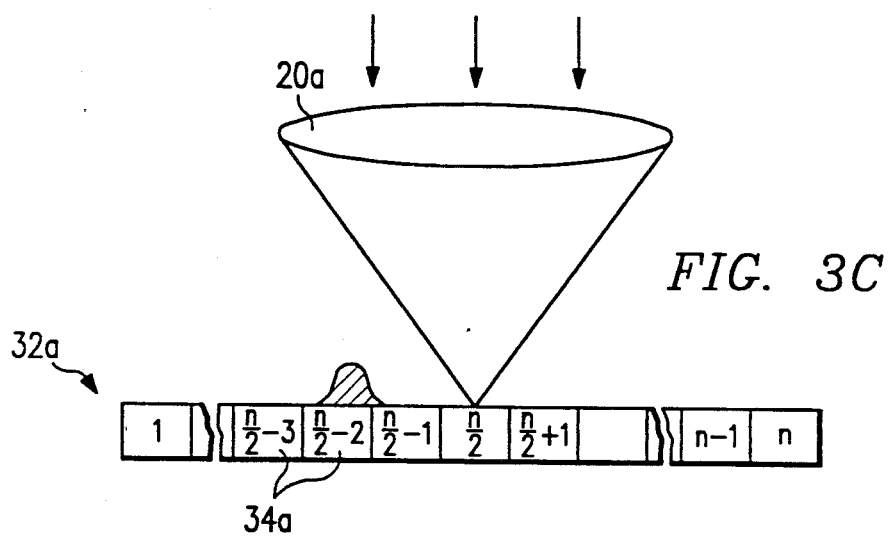

To conserve the stored signal for further integration of pulses within the detector, the shift direction is reversed and half the pixels are shifted to the left. This shifting returns the original charges plus any received charge to their original pixels 34a. The signal is now stored in the left half of the array 32a, as shown in FIG. 3C, which is the proper position for integrating the next pulse utilizing the above process. After an appropriate number of pulses have been integrated, the CCD array 32a is read out as described for the mechanical approach, again with high SNR.

The second implementation for the electronic scanning aspect is illustrated in FIG. 4A. In this implementation, a storage area 60 is added to eliminate the inefficiency of reverse shifting for charge accumulation. Optionally, an output register 66 is also added to eliminate the loss of time and/or data during the readout of the array 32b.

Figure 4B:
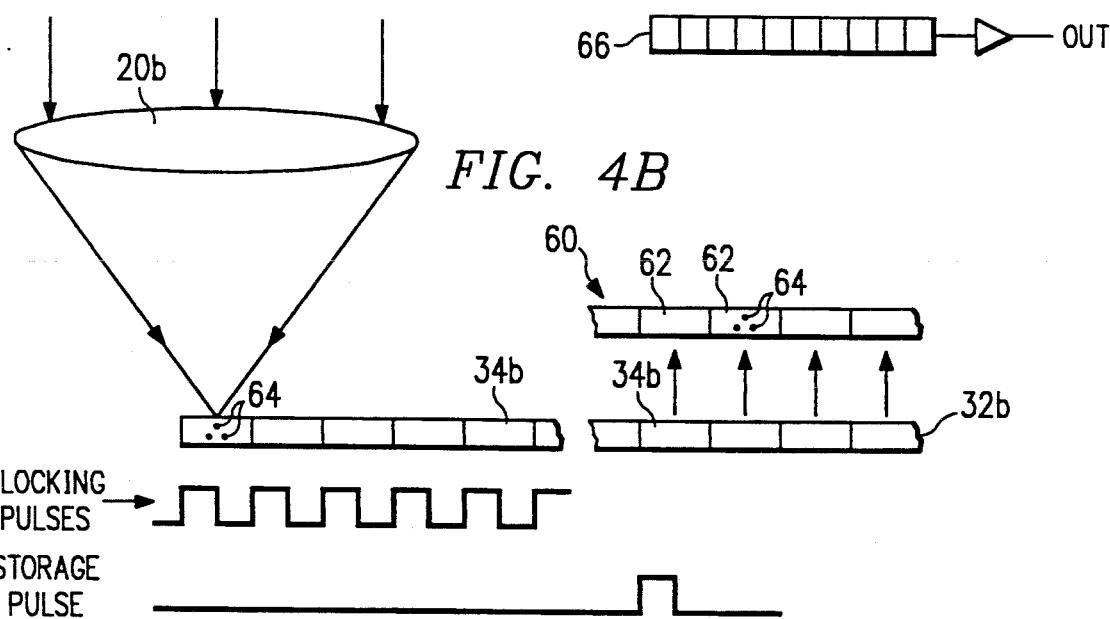
FIGS. 4B-4C illustrate the receiving, shifting, storing and readout of reflected light pulses by the linear CCD with storage and optional output CCD registers of FIG. 4A.

FIG. 4B more fully illustrates the mechanics of electronic scanning using a linear CCD array 32b having a storage area 60. For this implementation, the receiving lens 20b is focused on the left-most pixel 34b of the array 32b, which consists of n pixels 34b. In response to a delayed synchronizing signal that triggers the laser pulse as well as CCD clocking pulses, the contents of each CCD pixel 34b are shifted from left to right, pixel by pixel. This is continued for n clock cycles, after which the shifting is stopped. If an object is in the distance range, the pulse will have returned during the shifting and will have struck one or more of the shifting regions. The resultant signal will reside on the pixel(s) 34b corresponding to the scan clock cycle at which the pulse returned. Upon receiving a command in the form of a storage pulse, the contents of each pixel 34b are shifted into its corresponding position 62 in the storage area 60. The signal amplitude and location in the form of charge 64 are therefore stored, and the system is ready for receiving the next pulse. Since the received pulse has been transferred to the storage area 60, there is no need to shift the array 32b back to its original position, as is the case for the first implementation discussed above. Therefore, additional pulses can be integrated by repeating the above-discussed process without losing time for scanning the charges back to their original positions.

After the last laser pulse has been received by the CCD 32b, rather than shifting any charges held in the scanned pixels 34b into their corresponding positions 62 in the storage area 60, charges from each position 62 of the storage area 60 are shifted back into their corresponding pixels 34b. This is illustrated by the solid lines in FIG. 4C. The charge in each of the n pixels is then read out. Data from the pixels 34b is then treated in the same way as the data from the pixels 34 of FIG. 1.

Figure 4C:
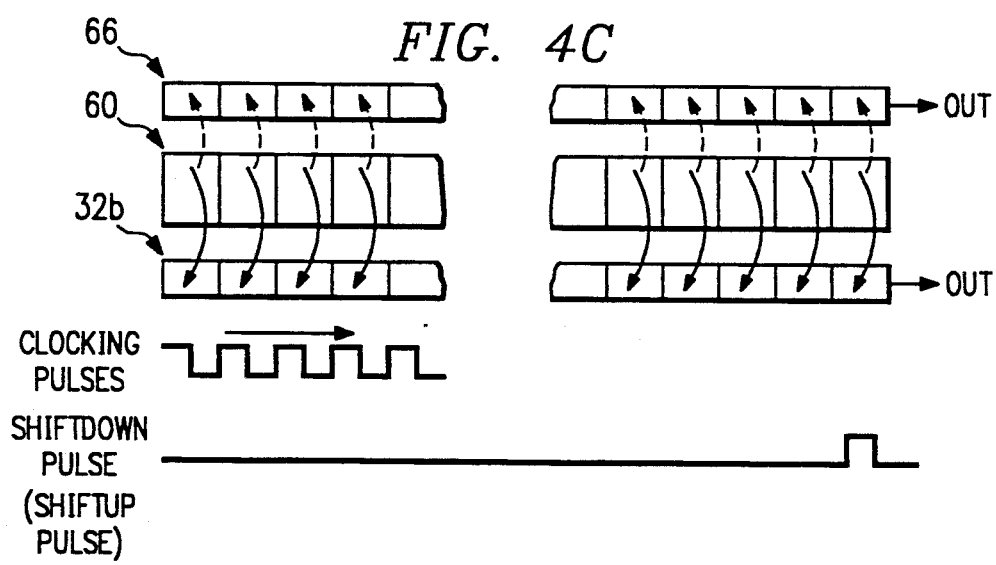

Alternatively, the optional output CCD register 66 illustrated in FIGS. 4A and 4C can be employed to eliminate time lost while reading out. When the output CCD register 66 is utilized, the stored data from the storage area 60 is transferred when desired to the output register 66 as illustrated by the dashed lines in FIG. 4C. The data is read out of each position of the storage register 66 just like it is read out from the CCD array 32 of FIG. 1 and the array 32a of FIG. 3A. However, the data can be read out while the scanning CCD array 32b continues to collect and store new data. Through this process, a duty cycle of 100% is achieved.

The third implementation of the electronic scanning aspect of the present invention is illustrated in FIG. 5. The radiation receiving portion 14c in this implementation is identical to the radiation receiving portion 14a of FIG. 3A and 14b of FIG. 4A, except that the Si CCD array 32c of FIG. 5 has a detector 36 of different wavelength sensitivity bonded to a pixel 34c which lies at the focal point of the lens 20c. Signal data is transferred to the adjoining pixel 34c, where it is electronically shifted across the array 32c in an operation identical to that described for FIGS. 3A and 4A.

This implementation of the invention is presented to offer operation at different wavelengths while taking full advantage of the maturity of Si CCD technology for the scanning operation. In this way, the spectral window can be expanded beyond the Si response curve, making possible the advantages discussed above with respect to non-Si detector devices. For example, the detector 36 can be an infrared detector, which would permit the system to be utilized with infrared radiation, the advantages of which are well known.

FIG. 6 illustrates a block diagram of the system electronics for the electronic scan system. The system electronics required for driving an electronic scanner is slightly different than that for the mechanical scanner. The electronic scan system has several advantages over mechanical system, including the elimination of the mirror and necessary calibration, maintenance, etc. associated with mechanical devices. Additionally, due to the nature of the electronic scan system, greater flexibility is possible relative to the mechanical scan system. This flexibility can be provided by a microprocessor 70 which includes memory (not shown) for storing the various control programs for effecting different scans for various distances, ranges and accuracy. Also stored in memory are the above-discussed algorithms for calculating range to the sub-pixel level if so needed. The microprocessor 70, in accordance with one of the stored programs, sets a variable oscillator 72 to a desired frequency. The output of the variable oscillator 72 is provided to both a laser controller 74 and a delay counter 76 for the electronic scanning portion of the system. The delay counter 76 is also connected to the microprocessor 70 for receiving data regarding the required delay for the scan to be performed. As in the mechanical scanning embodiment, the delay counter 76 provides the required offset between the production of the laser pulses and the scanning, albeit electronic in this embodiment. The delayed frequency is then provided to a CCD controller 78 for effecting the scan. The laser controller 74 is also connected to the microprocessor 70. Based on the input frequency and instructions from the microprocessor 70, the laser controller 74 causes the laser 16 to output laser pulses having the appropriate pulse width and time interval repetition rate. The optics of the radiation transmitter in this embodiment are identical to the receiving optics in the mechanical scanning embodiment.

The microprocessor 70 also controls the CCD controller 78. Based on the input frequency from the variable oscillator 72 and instructions from the microprocessor 70, the CCD controller 78 scans the CCD arrays 32a–32c in the manner discussed above. Similarly, for the CCD array 32b having the storage area 60, the storage process is controlled in synchronization with each output laser pulse as discussed. At the end of the pulse set or as desired, the CCD controller 78 either causes the stored charges to be shifted from the storage positions 62 back to the respective pixels 34b or causes their transfer to respective positions in the optional storage register 66, depending on the configuration. The CCD controller 78 then causes the data to be read out from either the array 34b or the storage register 66. This data is transferred from the CCD controller 78 to the microprocessor 70 where the distance to the object(s) is calculated and output for further processing or for reading out.

If a laser source is being used which has spectral characteristics outside of the Si quantum response curve, a mechanical scan must be used with an appropriate CCD or the equivalent so a mechanical scan can be performed using charge transfer properties of CCDs. Alternatively, Si technology can be used by bonding an appropriate detector to a Si CCD as shown in FIG. 5. Charge transfer and on-chip charge storage increase enormously the flexibility and sensitivity of the charge integration range detector of the present invention. Given current Si CCD technology, this range detector invention becomes signal/background shot noise limited after less than 10 detected photons and can detect and integrate signals of less than one photon per pulse with high efficiency.

The equivalent range for each pixel is determined by the pixel scan rate and speed of light. Assuming a current maximum rate of $40 \times 10^6$ pixels per second, the minimum pixel equivalent range is 3.75 meters, which is twice the range resolution at a SNR of 1.0. At higher SNR and with interpolation, the range resolution is approximately 1.87 meters. Future improvements in CCD technology and enhancements to this invention will improve the performances even further.

Three-Dimensional Imaging

A known method of obtaining a three-dimensional image of an object is to employ a range detector to scan a direction and record the range as a function of direction. The composite of range versus direction forms a three-dimensional image of the scene over which the ranger was directed. This is a time consuming process because each picture element of the scene requires an independent range measurement. Thus, a scene of $n \times m$ elements requires an equivalent number of independent measurements.

The present invention provides a number of faster techniques by which three-dimensional information can be obtained. For example, a fan-shaped or slit radiation pulse can be used in combination with a two-dimensional CCD array. In such a system, an object area is "illuminated" incrementally step-by-step by a series of fan-shaped pulses until the entire area has been illuminated. The returning radiation from each pulse is scanned over a respective linear portion of the two-dimensional array. After the entire object area has been ranged, the two-dimensional CCD array will contain an image of an object in the object area.

Another aspect of the electrical scanning embodiment of the present invention provides an improved three-dimensional imaging technique which is accurate and even faster. Rather than the focused image directly striking one of the pixels in a CCD array, an optical transfer is employed which maps an imaged two-dimensional scene to a linear CCD, as illustrated in FIG. 7. With this enhancement, a three-dimensional image of an object is formed with a single measurement, given a sufficient number of photons are received from the single pulse.

The transmission optics are the same as previously described, except that the optics must illuminate the desired scene, as opposed to the above-described rangers, in which a single spot can be illuminated.

The receiver 14d must be adapted so that an object area (scene) is imaged, with the imaged area being transferrable and readable. This is accomplished by forming a two-dimensional imaging surface 90, which is positioned not at the focal point of a receiving lens 20d, but at a focal plane generally parallel to the lens 20d so that reflected photons from the pulse will strike the imaging surface 90 dependent upon the point of the object area from which they were reflected. The imaging surface 90 is composed of an $n \times m$ array comprising open first ends of optical fibers 92. The open end of each optical fiber 92 receives photons from an object via the receiving lens 20d. The received photons from the end of each optical fiber 92 are transferred through each optical fiber 92 to the linear CCD array 32d. Each optical fiber 92 has a like predetermined number of pixels 34d which are dedicated exclusively to it. The second ends of the fibers 92 are spaced apart on the array 32d by the predetermined number of pixels and face or are focused on a first of their associated pixels. The dedicated location on the array 32d and the focal plane position of each fiber 92 are thus known. Theoretically, each fiber 92 can have a large number of pixels 34d associated therewith at the dedicated location on the array 32d. However, in practice, this would result in very long read out times for the array 32d. Accordingly, the mean range to the scene of interest is assumed known by a prior range measurement, so the depth of the object area is minimized, as is the number of pixels for each fiber 92.

As described previously with respect to the other electronic scanning implementations illustrated in FIGS. 3–5, a laser pulse is generated and the CCD scan is delayed for the appropriate scene range. The CCD scan is started just prior to the arrival of the return pulse from the scene. The CCD array 32d is scanned (left to right in FIG. 7) only by the number of pixels dedicated to the individual fibers 92, which is a constant. The scanning is stopped after the number of pixels 34d dedicated to each fiber 92 have been scanned. During the scan period, the pulse will return from any object in the scene area. The range from points on the surface of the object to their associated fibers 92 on the array 90 is dependent upon the time of arrival at each optical fiber 92, as recorded by the signal location in the CCD array 32d. Because the position of each fiber 92 on both the surface of the array 90 and the CCD array 32d are known, time to each respective point of an object (distance) and location of each respective point are stored in the CCD array 32d. Thus, if the object is closer relative to a first fiber 92 than it is to a second fiber 92, then, for example, a first pixel associated with the first fiber 92 will store a signal, while the second or third pixel associated with the second fiber 92 will store a signal. A plurality of such pulses can be scanned and received for low noise integration within the detector as previously described for higher SNR or lower laser power prior to readout.

Figure 8:
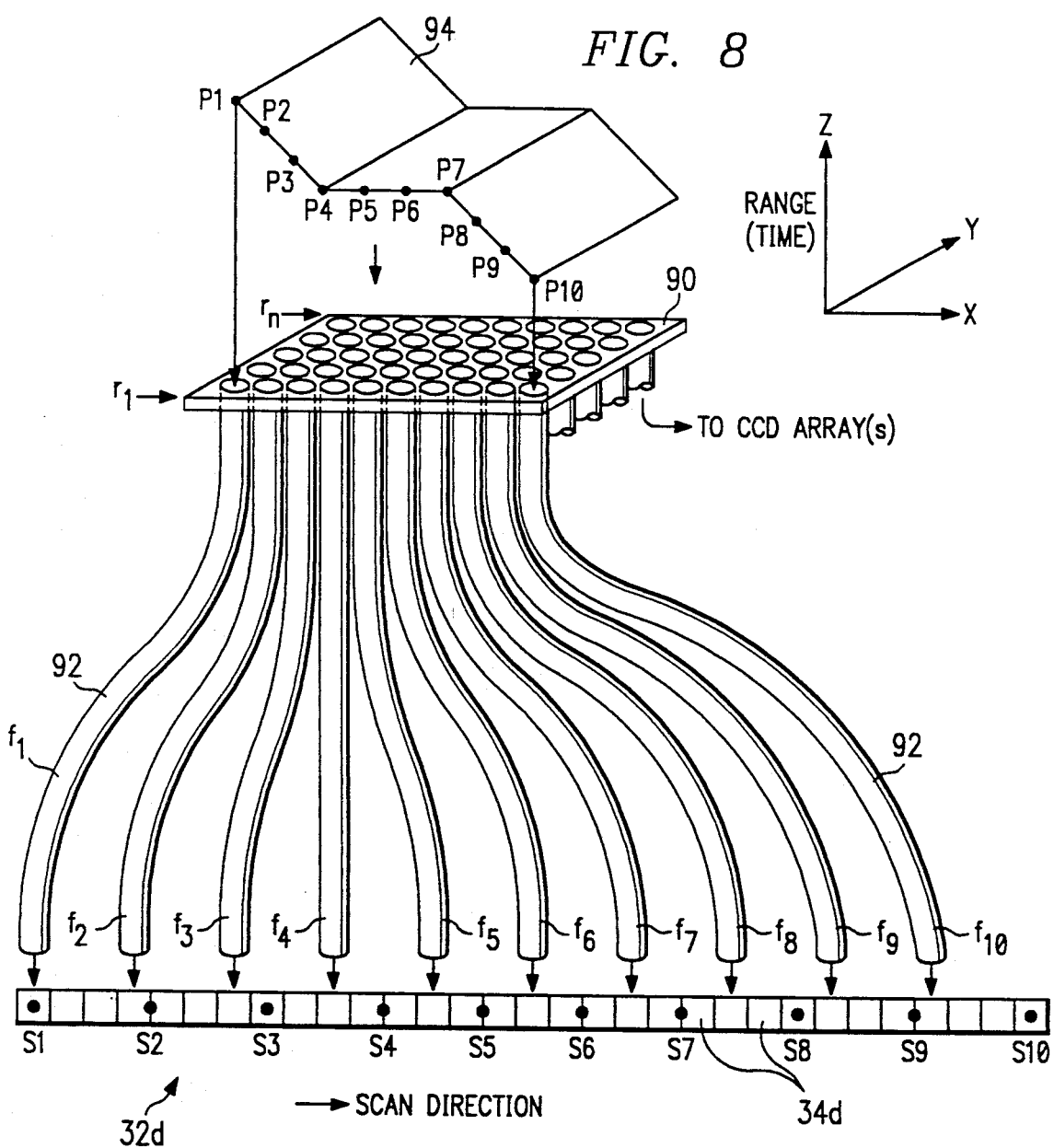
FIG. 8 illustrates signal storage in a CCD array in the receiving portion of the three-dimensional imager illustrated in FIG. 7.

Horizontal and vertical scene information is obtained by reconstruction of the signals from the known location of fibers 92 in the focal plane. Relative distance to each element of the image is obtained by computing the number of CCD elements separating the respective fiber signals. FIG. 8 illustrates this process.

FIG. 8 illustrates the range to a linear portion of an object 94 as received by a portion of the CCD array 32d via a row $r_1$ of the array 90. In this example, the row $r_1$ of the array 90 comprises ten optical fibers 92, designated $f_1-f_{10}$. Each of the ten optical fibers $f_1-f_{10}$ detects data relative to the range of each of ten separate points $p_1-p_{10}$ on the surface of the object 94. Each optical fiber $f_1-f_{10}$ has three pixels 34d in the CCD array 32d associated therewith, and each fiber is focused on the leftmost pixel in its set of three pixels. Upon scanning of the CCD array 32d from left to right during ranging, the location of the returned signal in the three pixels 34d associated with each fiber $f_1-f_{10}$ will being indicative of the distance between each point $p_1-p_{10}$ and the end of each optic fiber $f_1-f_{10}$ on the surface of the array 90.

As mentioned above, scanning only three pixels is practical only when a very good idea of the range of the object is known. As illustrated in FIG. 8, upon the implementation of a scan at the appropriate time after a pulse has been transmitted, the first signal from the pulse received by the array 90 is from point $p_{10}$. Upon completion of the left to right scan, signal $s_{10}$ from point $p_{10}$ will be found in the third pixel associated with fiber $f_{10}$, indicating that the signal $s_{10}$ was received early in the scan and that point $p_{10}$ of the object 94 is close relative to the depth of the scene being scanned. Just as described previously relative to ranging, the distance to point $p_{10}$ will be known because of the location of signal $s_{10}$ in the three pixels associated with fiber $f_{10}$. Additionally, range to point $p_{10}$ to within a fraction of the distance range represented by the third pixel can be determined by the use of pulse integration and the known algorithms to provide intra-pixel resolution. Likewise, the last signal from the pulse received by the fibers $f_1-f_{10}$ is from the point $p_1$ on the object 94, and is received by the fiber $f_1$ and stored in the first pixel 34d associate shape of the fiber $f_1$. By performing the above-described processing for each of the remaining points $p_2-p_9$, the distance to each point $p_1-p_{10}$ can be determined. Then, the shape of the surface of the object 94 from point $p_1$ to point $p_{10}$ can be determined through interpolation. By combining distance data relative to each fiber, the shape of the surface of the object 94 can be determined.

By reading out the CCD array 32d in the manner described previously with respect to the prior embodiments, and with the knowledge of the relationship between the pixels and the optical fibers of the array 90, three-dimensional object information can be obtained. The system electronics for this embodiment are also illustrated in FIG. 6. The microprocessor 70 reads out the CCD array 32d via the CCD controller 78. Memory (not shown) associated with the microprocessor 70 already has data regarding the range represented by each pixel in each pixel set represents the order in which the pixel sets are read out from the CCD array 32d, and any resolution algorithm to be employed. Based on this stored data and the location of each stored charge relative to the other stored charges being read out, relative range from each fiber can be determined.

Depending on process capabilities and/or design choice, a single CCD array or a CCD array corresponding to each row of the array 90 can be employed. The z axis data (distance) to each point on the object 94 is obtained as described above by determining the distance between each point on the array 90 and its corresponding point on the object 94. The x and y axes data for each point are known from the location of each optical fiber 92 on the array 90 and its known feed location on the CCD array(s) 32d.

A 5000 element CCD array with fiber separation of five pixels provides a 1000 element image of the scene. More points on the object can be imaged by using a larger CCD array or multiple CCD arrays that are suitably large. As with the previously discussed electronic scanning implementations, the range interval for the three-dimensional image is controllable by varying the CCD scan rate.

A three-dimensional image of an object can be formed with a single measurement with the above-discussed system. The sensitivity and range resolution for obtaining three-dimensional object information are the same as for ranging. However, the laser power or number of pulses must be increased for equivalent SNR because a larger area is being irradiated.

While several embodiments of the invention have been discussed, it will be appreciated by those skilled in the art that various modifications and variations are possible, including the use of multiple linear CCD arrays or two-dimensional arrays to further enhance performance, without departing from the spirit and scope of the invention.

What I claim is:

1. A method for obtaining positional data regarding an object within a range of interest comprising the steps of:

(a) transmitting a radiation pulse into said range;

(b) scanning, relative to the radiation pulse, any of the pulsed radiation that is reflected from within the range, wherein any of the pulsed radiation that is reflected from within each of at least two separate and predetermined distance subranges of the range is received during substantially separate time periods by radiation sensitive means having at least two separate and predetermined charge accumulating means corresponding with said at least two separate and predetermined distance subranges, wherein charge is accumulated during the substantially separate time periods in each of said at least two separate and predetermined charge accumulating means in corresponding relation to substantially only that pulsed radiation that is reflected from within the corresponding predetermined distance subrange; and (c) generating positional data regarding said object utilizing said accumulated charge.

2. A method for obtaining positional data according to claim 1, further comprising, prior to said step (c), the step of:
(d) repeating said steps (a) through (b) for a plurality of radiation pulses.

3. A method for obtaining positional data according to claim 1, wherein a mirror is positioned to receive said pulsed radiation reflected from within said distance subranges and is pivoted relative to elapsed time from the transmission of the radiation pulse to direct the received radiation at respective ones of the separate charge accumulating means.

4. A method for obtaining positional data according to claim 3, wherein the pivoting of the mirror is started at a period of time following the transmitting of the radiation pulse and pivoted at a speed calculated so that the range of interest has a preferred distance and a preferred depth.

5. A method for obtaining positional data according to claim 1, wherein said at least two charge accumulating means comprise first and second charge accumulating means for separately accumulating said charge, wherein said first charge accumulating means is a first pixel in a CCD array and said second charge accumulating means is a second pixel in said CCD array, wherein said received radiation focused onto a predetermined pixel of said CCD array, and wherein said step (b) comprises shifting charges stored in said CCD array from pixel to pixel so that accumulated charge from said first pixel is in said predetermined pixel when radiation form the corresponding distance subrange is being received at said predetermined pixel and accumulated charge from said second pixel is in said predetermined pixel one radiation from the corresponding distance subrange is being receiving at said predetermined pixel.

6. A method for obtaining positional data according to claim 5, wherein the charges are shifted from pixel to pixel at a predetermined rate beginning a predetermined time after the radiation pulse is transmitted so that the range of interest has a calculated beginning distance and a known depth.

7. A method for obtaining positional data according to claim 1, wherein said at least two charge accumulating means are adjacent pixels in a CCD array, and wherein said step (c) further comprises determining a multiple pulse centroid in the CCD array to calculate range to a sub-pixel level.

8. A method for obtaining positional data according to claim 5, wherein said method further comprises the step of:
(e) repeating said steps (a) through (b) for a plurality of radiation pulses.

9. A method for obtaining object data comprising the steps of:
(a) transmitting a radiation pulse to an object area;
(b) scanning, relative to the radiation pulse, radiation received from the object area, wherein radiation from the radiation pulse reflected from within each of at least two separate and predetermined distance subranges in the object area is received and charge accumulated during substantially separate time periods by a radiation-sensitive means having at least two separate and predetermined radiation sensitive portions corresponding to said at least two separate and predetermined subranges, wherein charge is accumulated during the substantially separate time periods in each of the at least two separate and predetermined portions in corresponding relation to substantially only that pulsed radiation that is reflected from within the corresponding predetermined distance subrange; and
(c) determining the distance to objects in the object area based on the charge accumulated in each of said portions of the radiation sensitive means.

10. A method for obtaining object data according to claim 9, wherein the said step (a) and said step (b) are initiated by a common signal, said method further comprising the step of:
(d) delaying the common signal prior to supplying the common signal for initiating said step (b) such that a desired distance range is scanned for an object.

11. A method for obtaining object data according to claim 10, wherein said step (b) further comprises controlling scanning speed dependent upon the difference between a maximum distance and a minimum distance in the distance range being scanned.

12. A method for obtaining object data according to claim 9, wherein the radiation pulse is a laser pulse generated by a laser and the radiation-sensitive means comprises a one-dimensional CCD array having a predetermined number of pixels, wherein each of the separate and predetermined portions corresponds to one of the pixels.

13. A method for obtaining object data according to claim 12, wherein charge from the radiation received during said step (b) is stored in the pixel the radiation strikes, said method further comprising the step of (e) repeating said steps (a) and (b) for a predetermined number of pulses prior to initiating said step (c).

14. A method for obtaining object data according to claim 13, wherein said step (b) further comprises scanning a mirror so that radiation from the object area is scanned across the CCD array relative to the generation of the laser pulses so that the radiation from each of the laser pulses which is reflected off objects in the object area strikes one or more of the pixels of the CCD array dependent upon the distance of the objects from the array and is stored therein.

15. A method for obtaining object data according to claim 14, wherein said step (c) further comprises reading out the CCD array to determine which of the pixels has received radiation reflected from the object.

16. A method of obtaining object data according to claim 12, wherein the scanning of said step (b) is controlled relative to the transmission of each laser pulse in said step (a) so that each of the pixels represents a distance from said system to the object area.

17. A method of obtaining object data according to claim 16, further comprising the steps of:
(g) prior to said step (c) storing any radiation received during said step (b) in the pixel the radiation strikes; and
(h) repeating said steps (a), (b) and (g) for a predetermined a quantity of charge accumulated in each of the pixels to determine distance to objects in the object area.

18. A method for obtaining object data according to claim 17, further comprising the step of (h) determining a multiple pulse centroid in the array of pixels to calculate range to the sub-pixel level.

19. A system for obtaining object data comprising:
(a) first means for transmitting a series of at least one radiation pulse to an object area based on a command signal;
(b) second means for receiving returning radiation from the series of radiation pulses reflected from the object area and selectively redirecting the returning radiation relative to each pulse; and (c) at least two radiation detectors arranged to receive and accumulate charge in relation to the redirected returning radiation, wherein said second means selectively redirects the returning radiation of each pulse reflected from within each of at least two separate and predetermined distance subranges within the object area, reflected radiation from each of the distance subranges being received and charge accumulated during substantially separate time periods, and wherein each of said at least two radiation detectors corresponds with one of said at least two separate and predetermined distance subranges.

20. A system for obtaining object data according to claim 19, wherein object data is determined based on which of said radiation detectors receives the redirected returning radiation.

21. A system for obtaining object data according to claim 19, wherein the radiation pulses are laser pulses and said first means includes a laser and a laser controller connected to the laser for controlling the laser to transmit the laser pulses based upon the command signal.

22. A system for obtaining object data according to claim 21, wherein said second means includes a scanning mirror and scanning mirror control means for controlling the scanning of the scanning mirror relative to each laser pulse based on the command signal so that returning radiation from each pulse is redirected to strike at least one of said radiation detectors dependent upon distance to the object.

23. A system for obtaining object data according to claim 22, wherein said radiation detectors comprise pixels in a one-dimensional CCD array, each of said pixels being representative of a different distance subrange in the object area.

24. A system for obtaining object data according to claim 23, wherein the object characteristics includes an object distance range defined by a minimum and maximum distance in which an object is to be sought, and the object distance range is scanned by delaying the start of the scanning of the mirror and controlling the speed of the scanning of the mirror relative to each pulse based on the speed of light and the time necessary for a pulse to reach and return from the minimum distance and the maximum distance.

25. A system for obtaining object data according to claim 24, wherein the returning radiation from each of the pulses is stored as a charge in the pixel the returning radiation strikes, and the pixels are read out after integration of the returning radiation from the series of pulses.

26. A system for obtaining object data according to claim 19, wherein the returning radiation from each pulse strikes at least one of said radiation detectors and is stored as a charge in the at least one of said radiation detectors so that the returning radiation from the series of pulses is integrated in said radiation detectors, distance to the object being determined by which of said radiation detectors has stored the largest charge.

27. A system for obtaining object data according to claim 26, wherein after a first series of pulses are integrated and object distance is determined, object characteristics by which said second means is controlled to selectively redirect the returning radiation from each pulse are changed based on the determined object distance.

28. A system for obtaining object data according to claim 19, wherein the object characteristics include a distance range in which an object is being sought.

29. A system for obtaining object data according to claim 25, further comprising means for determining a multiple-pulse centroid of the returning radiation in said CCD array and calculating distance to a sub-pixel level based on the determined multiple-pulse centroid.

30. A system for obtaining object data according to claim 22, wherein the laser is a GaAs laser diode and the laser pulses have wavelength of 0.904 microns, and the CCD array is a Si CCD array.

31. A system for determining characteristics of an object comprising:
first means for generating a series of radiation pulses and transmitting the pulses toward an object area;
second means for focusing the returning radiation; and
third means for receiving and storing returning radiation reflected from the object area, a focal point of said second means being located proximate to said third means;
wherein said third means is scanned relative to each radiation pulse so that any of the pulsed radiation that is reflected from within each of at least two separate and predetermined distance subranges of the object area is received during substantially separate time periods by said third means, which includes at least two separate and predetermined charge accumulating means corresponding with said at least two separate and predetermined distance subranges, wherein charge is accumulating means corresponding with said at least two separate and predetermined distance subranges, wherein charge is accumulated during the substantially separate time periods in each of said at least two separate and predetermined charge accumulating means in corresponding relation to substantially only that pulsed radiation that is reflected within the corresponding predetermined distance subrange.

32. A system for determining characteristics of an object according to claim 31, wherein said third means comprises a one-dimensional CCD array having a predetermined number of pixels and each of said charge accumulating means corresponds to one of the pixels, and wherein said second means focuses the returning radiation pulse onto a predetermined one of the pixels and the CCD array is controlled to shift charges stored in each pixel from pixel to pixel when receiving the returning radiation so that a charge from the returning radiation is stored in one or more of the pixels dependent upon the distance of the object.

33. A system for determining characteristics of an object according to claim 32, wherein said second means focuses the returning radiation onto a central one of the pixels, and charges stored in the pixels on a first side of the central pixel are first transferred from pixel to pixel past the central pixel to the pixels on a second side of the central pixel during an anticipated radiation return time for each pulse and then transferred back to their original position together with any received charge such that the pixel in which the most charge is stored is representative of a distance to the object.

34. A system for determining characteristics of an object according to claim 33, wherein the CCD array is read out after a predetermined number of pulses have been integrated therein.

35. A system for determining characteristics of an object according to claim 32, wherein said second means focuses returning radiation on a pixel at an end of the CCD array, and the CCD array is controlled to transfer any charge received in the end pixel from pixel to pixel during an anticipated pulse return time, said third means further comprising a storage register including a position corresponding to each of the pixels in the CCD array, charge received by the pixels of the CCD array being transferred to their corresponding position in the storage register at the end of the anticipated radiation pulse return time.

36. A system for determining characteristics of an object according to claim 35, wherein after the returning radiation from a predetermined number of radiation pulses has been received and stored in the storage register, the stored radiation charges are transferred back to their corresponding pixels in the CCD array and read out to determine object distance based on radiation charge location in the CCD array.

37. A system for determining characteristics of an object according to claim 35, wherein said third means further comprises an output register which comprises a position corresponding to each position in the storage register, such that after returning radiation from a predetermined number of pulses has been integrated into the storage register, the stored charge in each position is transferred to its corresponding position in the output register and read out from the output register to determine object distance based on charge location in the output register.

38. A system for determining characteristics of an object according to claim 35, wherein the end pixel has a wavelength detector bonded thereto for receiving the returning radiation.

39. A system for determining characteristics of an object according to claim 38, wherein the CCD array is a silicon CCD array and the wavelength detector is sensitive to radiation wavelengths other than the pixels of the silicon CCD array, and the wavelength detector operates in conjunction with the end pixel, the wavelength detector receiving returning radiation and transferring the resulting charges to the end pixel for scanning.

40. A system for determining characteristics of an object according to claim 31, wherein the radiation pulses are laser pulses and said first means includes a laser and a laser controller connected to the laser for controlling the laser to transmit the laser pulses based upon a command signal.

41. A system for determining characteristics of an object according to claim 37, further comprising means for determining the multiple-pulse centroid of the returning radiation and calculating distance to a sub-pixel level based on the determined multiple-pulse centroid.

42. A system for obtaining a threedimensional image of an object in an object area comprising:
first means for transmitting a radiation pulse to the object area;
second means for separately receiving returning radiation from the pulse reflected from each a plurality of sub-areas in the object area; and
third means for separately receiving from said second means the returning radiation from each sub-area, scanning, relative to the radiation pulse, the pulsed radiation that is received from said second means for each sub-area, wherein any of the pulsed radiation that is reflected from within each at least two separate and predetermined distance subranges in each sub-area is received during substantially separate time periods by radiation sensitive means of said third means, the radiation sensitive means having at least two separate and predetermined charge accumulating means corresponding with said at least two separate and predetermined distance subranges, wherein charge is accumulated during the substantially separate time periods in each said at least two separate and predetermined charge accumulating means in corresponding relation to substantially only that pulsed radiation that is reflected from within the corresponding predetermined distance subrange, wherein said third means determines the shape of a surface of an object in the object area therefrom.

43. A system according to claim 42, wherein the radiation pulse is a laser pulse said first means includes a laser and a laser controller for generating the laser pulses based on a command signal.

44. A system according to claim 42, wherein said second means comprises a lens for focusing the returning radiation and a plurality of optical fibers, one corresponding to each of the sub-areas in the object area, each of the optical fibers having a first end arranged in a common focal plane of the lens, and said radiation-sensitive means of said third means comprises a CCD array, the array having one set of pixels corresponding to each of the optical fibers, each set of pixels comprising to one of said charge accumulating means, each set being positioned relative to a second end of its corresponding optical fiber for receiving the radiation relative to the corresponding sub-area from the corresponding optical fiber, means for scanning the pixels when the returning radiation is anticipated to return, and means for reading out the CCD array to determine distance to each an object in each sub-area and the shape of the surface of the object based on the distance to each of the sub-areas.

45. A system according to claim 44, wherein said first means generates and transmits a plurality of radiation pulses and the returning radiation for each of the sub-areas is integrated in its corresponding set of pixels.

46. A system according to claim 44, wherein each pixel in each pixel set represents a different distance to the sub-area in the object area corresponding to the pixel set.

47. A system according to claim 44, wherein each of the pixel sets has n pixels, the optical fiber for each pixel set transferring radiation to a first pixel in its corresponding pixel set, said scanning means causing a charge stored in each pixel to transfer from pixel to pixel in a first direction up n times during an anticipated return time period for the returning radiation.

48. A system according to claim 47, wherein said first means transmits a plurality of radiation pulses, and after said scanning means scans the CCD array for each pulse, said scanning means scans the charges in a second direction back to their original position prior to scanning for a subsequent pulse.

49. A system according to claim 47, wherein an approximate distance to the object is known such that the number of pixels n in each pixel set is minimized and each pixel in each pixel set represents a very narrow distance range.

* * * * *